United States Patent
Alfier et al.

(10) Patent No.: US 9,837,192 B2
(45) Date of Patent: Dec. 5, 2017

(54) METHOD FOR PASSING AN ELECTRICAL CABLE THROUGH A HOLE AND DEVICE FOR SAME

(71) Applicant: OSRAM GmbH, Munich (DE)

(72) Inventors: Alberto Alfier, Vedelago (IT); Simon Bobbo, Chirignago (IT); Luca Volpato, Preganziol (IT)

(73) Assignee: OSRAM GMBH, Munich (DE)

(*) Notice: Subject to any disclaimer, the term of this patent is extended or adjusted under 35 U.S.C. 154(b) by 171 days.

(21) Appl. No.: 13/927,198

(22) Filed: Jun. 26, 2013

(65) Prior Publication Data
US 2014/0000937 A1    Jan. 2, 2014

(30) Foreign Application Priority Data
Jun. 27, 2012   (IT) .............. TO2012A0569

(51) Int. Cl.
   *H01B 17/26*   (2006.01)
   *H02G 3/06*    (2006.01)
   *H02G 3/22*    (2006.01)

(52) U.S. Cl.
   CPC ......... *H01B 17/265* (2013.01); *H02G 3/0675* (2013.01); *H02G 3/22* (2013.01)

(58) Field of Classification Search
   CPC ....... H02G 3/22; H02G 3/0675; H01B 17/265
   (Continued)

(56) References Cited

U.S. PATENT DOCUMENTS 2,530,258 A * 11/1950 Marsan ............... 174/153 G
5,295,851 A *  3/1994 Bawa ................. F16L 5/12
                                                  439/271
(Continued)

FOREIGN PATENT DOCUMENTS

CN      2927429 Y     7/2007
CN    201174543 Y    12/2008
(Continued)

OTHER PUBLICATIONS

English abstract for JP11273481 dated Oct. 8, 1999.
(Continued)

*Primary Examiner* — William H Mayo, III
*Assistant Examiner* — Hiram E Gonzalez
(74) *Attorney, Agent, or Firm* — Viering, Jentschura & Partner mbB

(57) ABSTRACT

A method for passing an electrical cable through a hole in a housing of a unit of electrical equipment is provided. The method may include: fitting onto the cable a tubular, mushroom-shaped male member comprising a stem with a threaded portion and a portion with enlarged head; inserting into the hole the cable having the male member fitted thereon extending through said hole with said portion with enlarged head abutting against the periphery of the hole externally to the housing and said threaded portion protruding inside the housing; and retaining said male member in the hole by coupling with said threaded portion that protrudes inside the housing an annular female member in the form of a nut co-operating with the periphery of the hole inside said housing to counter the movement of the female member with respect to the housing.

9 Claims, 2 Drawing Sheets

(58) Field of Classification Search
USPC .................................................. 174/153 R
See application file for complete search history.

(56) References Cited

U.S. PATENT DOCUMENTS

| | | | | |
|---|---|---|---|---|
| 5,678,866 | A * | 10/1997 | Mina | .................... H02G 3/0616 |
| | | | | 174/153 A |
| 5,983,450 | A * | 11/1999 | Pratt | ................................ 16/2.1 |
| 6,575,474 | B1 * | 6/2003 | Zimmer | ............... H02G 15/013 |
| | | | | 174/93 |
| 6,579,014 | B2 * | 6/2003 | Melton | .......................... 385/76 |
| 7,568,943 | B2 * | 8/2009 | Harrison | ...................... 439/578 |
| 7,829,790 | B2 * | 11/2010 | Wheatley | .................... 174/75 C |
| 2005/0077725 | A1 | 4/2005 | Bartholoma et al. | |
| 2012/0298417 | A1 * | 11/2012 | Kempeneers | ............... 174/77 R |

FOREIGN PATENT DOCUMENTS

| | | |
|---|---|---|
| CN | 201813122 U | 4/2011 |
| DE | 7522286 U | 1/1976 |
| JP | 11273481 A | 10/1999 |

OTHER PUBLICATIONS

Chinese Office Action based on application No. 201310262747.X (6 pages and 7 pages of English translation) dated Jul. 20, 2016 (Reference Purpose Only).

* cited by examiner

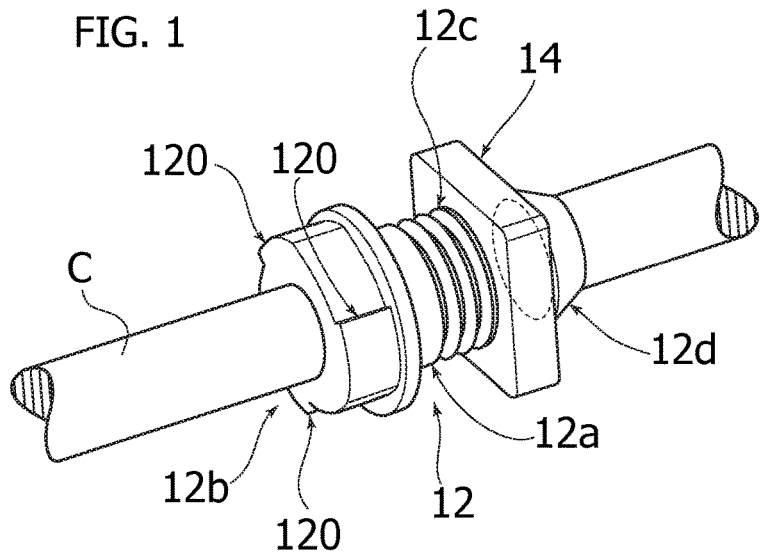
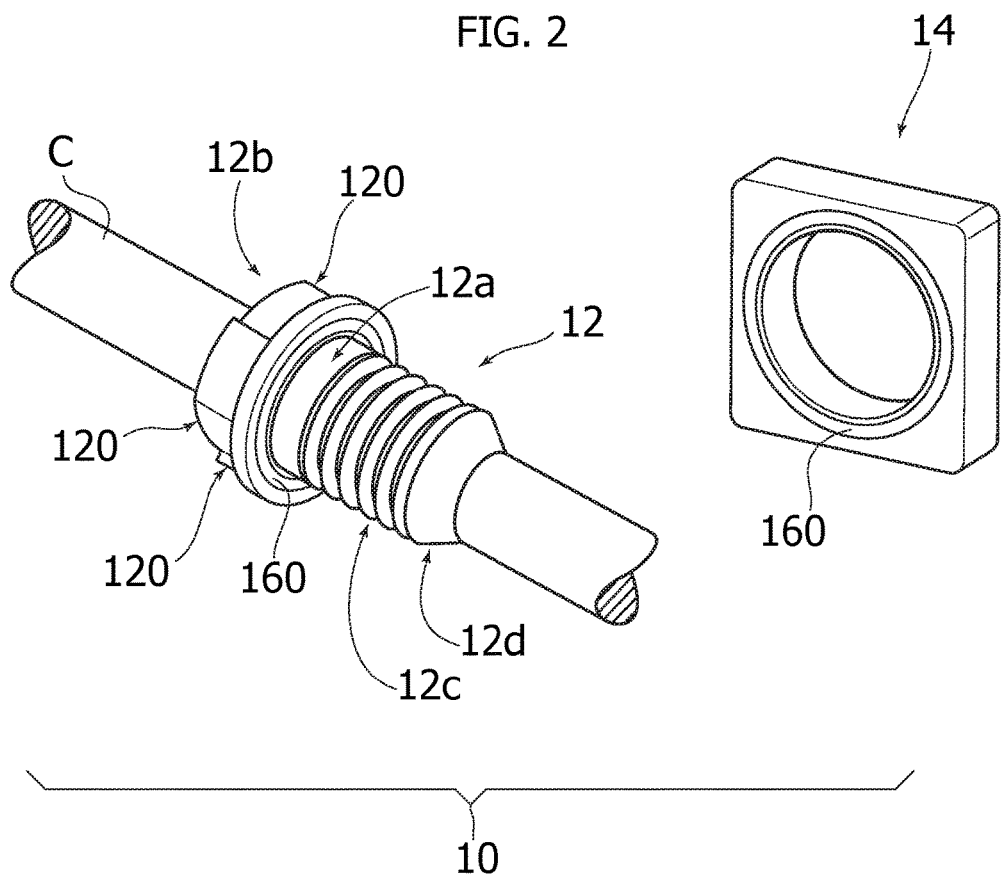

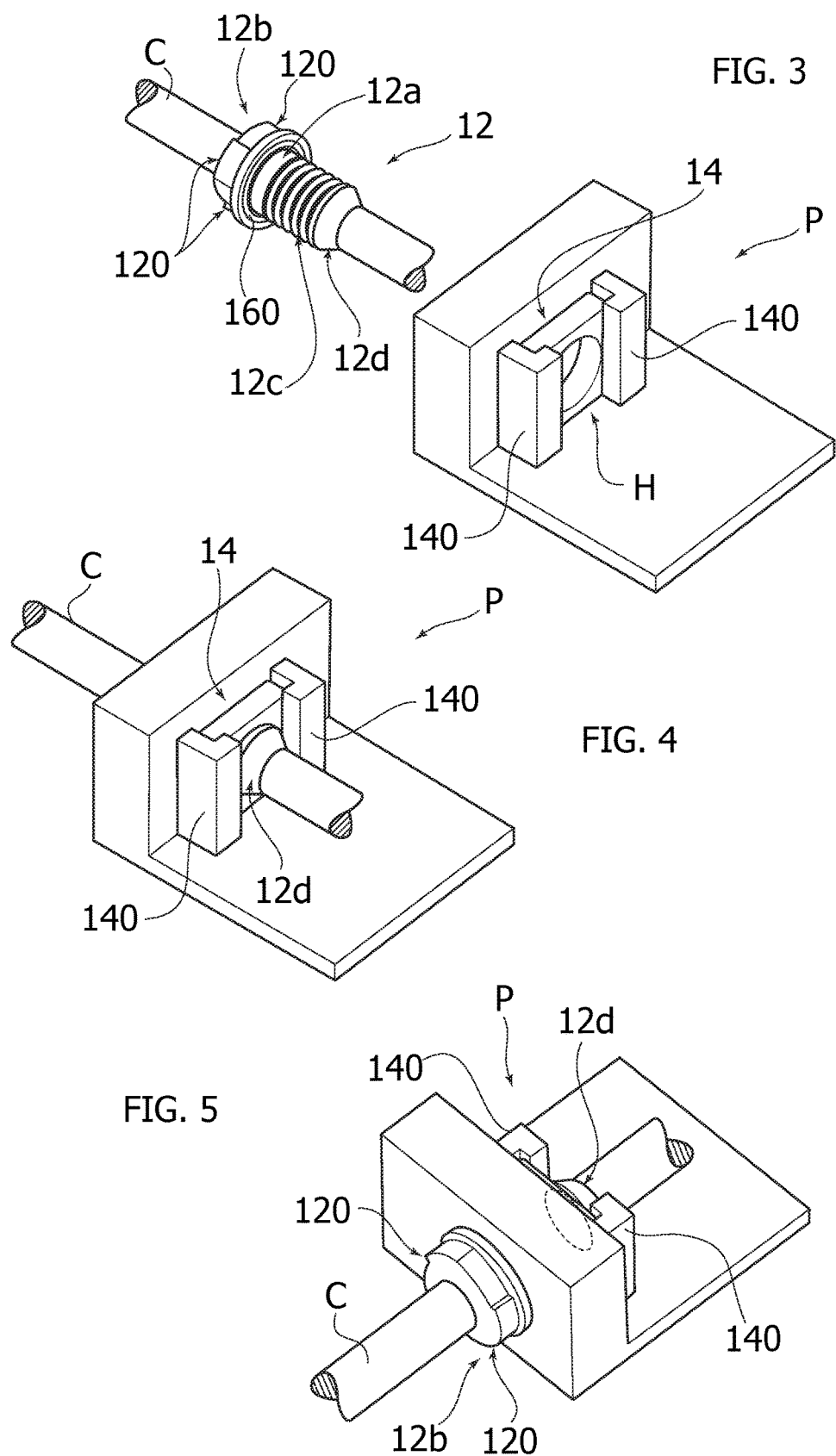

METHOD FOR PASSING AN ELECTRICAL CABLE THROUGH A HOLE AND DEVICE FOR SAME

CROSS-REFERENCE TO RELATED APPLICATION

This application claims priority to Italian Patent Application Serial No. TO2012A000569, which was filed Jun. 27, 2012, and is incorporated herein by reference in its entirety.

TECHNICAL FIELD

The present description relates to techniques for passing an electrical cable through a hole, for example in the housing of a unit of electrical equipment.

Various embodiments can relate to the techniques for passing a cable through a hole in a metal housing of a lighting source, such as for example a LED lighting source.

BACKGROUND

In sectors such as lighting technology for the exterior and for road applications, the need may arise to pass an electrical cable through a hole made in a housing of a lighting source, for example a LED source. In various solutions, it may be necessary to provide a protection, for example against the infiltration of dust and water (IP6x protection).

For this purpose, it is possible to use a sleeve with a gland to be inserted into the hole prior to passing the cable through it. This solution requires additional operations during the assembly (for example, in the case of LED lighting sources, during the assembly of the LED modules). In addition, a large part of the sleeve can protrude outside of the housing, which makes bending the cable difficult right at the exit from the housing and limits the overall flexibility of application of the module in the framework of lighting sources (luminaire). In various solutions, it can then be necessary to screw in a fixing screw operating on the internal side of the housing, in a place where there is normally not much space available.

Other solutions may include the use of a water-tight seal or grommet made of rubber or of supple elastomer and designed to be inserted into the hole prior to inserting the cable. These solutions may have drawbacks such as the insufficient retaining action on the cable, with the consequent requirement for providing auxiliary retaining systems (for example clamps with screws) inside the housing, with a consequent increase in the complexity of the assembly operation and of the costs.

The possibility then exists of using through connectors, capable of providing the protection against dust and water and including complementary elements designed to be assembled together, which may give rise to rather bulky solutions.

Within the application context considered here by way of example, it is desirable for the assembly operations to be reduced to a minimum, while conserving the possibility of bending the electrical cable also immediately at the exit of the hole passing through the housing. It can thus be desirable for the operations relating to the passage of the cable to be, at least for the most part, carried out from the outside of the electrical equipment given that the space available inside the housing may be somewhat limited.

SUMMARY

A method for passing an electrical cable through a hole in a housing of a unit of electrical equipment is provided. The method may include: fitting onto the cable a tubular, mushroom-shaped male member comprising a stem with a threaded portion and a portion with enlarged head; inserting into the hole the cable having the male member fitted thereon extending through said hole with said portion with enlarged head abutting against the periphery of the hole externally to the housing and said threaded portion protruding inside the housing; and retaining said male member in the hole by coupling with said threaded portion that protrudes inside the housing an annular female member in the form of a nut co-operating with the periphery of the hole inside said housing to counter the movement of the female member with respect to the housing.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIGS. 1 and 2 show, respectively in an assembled condition and in a separated condition, a device according to embodiments; and FIGS. 3 to 5 illustrate the implementation of embodiments.

DESCRIPTION

The following detailed description refers to the accompanying drawings that show, by way of illustration, specific details and embodiments in which the invention may be practiced.

In the following description various specific details are illustrated with the purpose of a deeper understanding of various embodiments. The embodiments may be implemented without one or more of the specific details, or with other methods, components, materials, etc. In other cases, known structures, materials or operations are not shown or described in detail in order to avoid obscuring the various aspects of the embodiments.

The reference to "an embodiment" in the framework of this description is intended to indicate that a particular configuration, structure or feature described in relation to the embodiment is included in at least one embodiment. Thus, phrases such as "in one embodiment", potentially present at various places within this description are not necessarily relating to the same embodiment. Furthermore, particular configurations, structures or features may be combined in any appropriate way in one or more embodiments.

The references used here are only for convenience and do not therefore define the scope of protection or the range of application of the embodiments.

There is a need to find solutions able to overcome the aforementioned drawbacks and various embodiments aim to provide a response to such a need.

In various embodiments, such a goal may be achieved thanks to a method having the features claimed specifically in the claims that follow. Various embodiments also relate to a device for the implementation of the method.

The claims form an integral part of the technical teachings presented here in relation to various embodiments.

Various embodiments aim to allow an electrical cable C to be passed through a hole H (see for example FIG. 3) made in a housing of a unit of electrical equipment.

In various embodiments, the equipment in question may be a lighting source such as, for example, a LED lighting source.

In various embodiments, the housing may, for example, be a one-piece housing made of metal material.

For simplicity and generality of illustration, the said housing is here shown in the form of a portion, indicated with P, schematically represented in the form of two walls joined together according to a general 'L' configuration. It will be appreciated that such a representation is here given purely by way of example and for simplicity of illustration: the housing P in which the hole H is present may, in reality, have any given configuration and structure.

In various embodiments, the cable C can be passed through the hole H in such a manner as to form sealing conditions, for example against dust and water (IP6x protection, for example).

In various embodiments, the diameter dimensions of the hole H could correspond to the diameter dimensions of the cable C so as to form a passage condition that, on the one hand, does not end up being excessively slack (with the risk of allowing the undesirable passage, for example, of dust and/or fluids through the hole H notwithstanding the presence of the cable C) and, on the other hand, does not end up being too tight (with the risk of giving rise to undesirable phenomena from crushing of the cable C).

In various embodiments, a device may be fitted around the cable C, indicated overall with 10 and including two parts (illustrated separately in FIG. 2), as follows:
  a male member 12, with a tubular structure and mushroom shape, provided with an axial opening for the cable C toward which the cable C can thus run axially, and
  a female member 14, with annular structure and taking the form of a nut, designed to be coupled with the male member 12.

In various embodiments, the male member 12 can have a stem part 12a and an enlarged head part 12b.

In various embodiments, the stem 12a can be threaded on the outside 12c and, potentially, have a tapered distal part 12d.

In various embodiments, the screw thread 12c may be formed as an assembly of threads whose ridges run along circumferences orthogonal to the alignment axis of the tubular member 12 designed to be fitted onto the cable C.

In various embodiments, the screw thread 12c may be a helicoidal screw thread, with the ridges of the thread running along one or more helicoidal paths.

In various embodiments, the male member 12 may be fitted onto the cable C by co-molding it onto the cable C.

In various embodiments, as is exemplified in FIG. 1, the head part 12b of the male member 12 may include a toothed outer surface, for example formed from a certain number (for example three) of crescent-shaped formations 120.

In various embodiments, this toothed outer surface allows the head part 12b—and hence the male member 12—to be gripped as a whole so as to be able to drive it in rotation about the main axis of the screw thread 12c, for example in order to enable a screwing operation (tightening and/or slackening) with respect to the female member 14.

In various embodiments, the female member 14 has a general structural equivalent to that of a nut, for example with a square shape (various shapes are naturally also possible, for example polygonal shapes with a number of sides different from four).

The female member 14 is designed to be placed inside the housing P in correspondence with the hole H.

In various embodiments, in such a position in the housing P, engagement formations 140 may be provided, for example profiled L-shaped elements (capable of being formed as part of the housing P), so as to form a channel for inserting the female member 14 in correspondence with the hole H in the housing P with the capacity of applying on the female member 14 a retaining action intended for example to prevent its undesirable displacement with respect to the axis of the hole H and/or its undesirable rotation with respect to the housing P.

The reference 160 then indicates sealing elements (for example an O-ring) capable of being mounted:
  on the face of the head part 12b of the male member 12 designed to be turned toward the hole H on the external side of the housing P (on the left according to the point of view of FIGS. 3 to 5), and/or
  on the face of the female member 14 designed to be turned toward the hole H on the internal side of the housing P (on the right according to the point of view of FIG. 3 to FIG. 5).

In various embodiments, the electrical cable C may be passed through the hole H of the housing P disposing the male member 12 on the cable C; as has already been mentioned, this may, for example, be where the member 12 is co-molded onto the cable C.

In various embodiments, the female member 14 may be disposed inside the housing P in alignment with the hole H, for example using for such a purpose the guide and retaining formations indicated with 140.

In various embodiments, the cable C is passed through the hole H with the male member 12 fitted onto the cable (see for example FIG. 4 and FIG. 5) carrying the member 12 so that it extends through the hole H with:
  the enlarged head part 12b abutting in the mode of a flange against the periphery of the hole H on the outside of the housing P,
  the threaded portion 12c extending, at least in part, inside the housing P where it can be coupled (for example by screwing, but potentially also only by axial forcing) with the female member 14.

The female member 14 may thus come to rest abutting onto the periphery of the hole H inside the housing P holding the male member 12 (and the cable C on which the same is fitted) in the desired position for fixing onto a housing P.

In various embodiments, the diameter dimensions of the male member 12 (particularly in the threaded portion 12c) may be chosen in a coordinated way with the diameter dimensions of the cable C and the diameter dimensions of the hole H in such a manner as to allow its insertion with a contained play or with slight interference of the stem 12a of the male member 12 inside the hole H.

The coupling with the female part 14 (in particular when implemented via screwing) allows an action of axial traction to be applied to the enlarged head part 12b of the male member 12 and to the female member 14 abutting against the wall of the housing P on opposing sides (on the outside and on the inside) of the hole under conditions in which the seals 160 perform (or complete) the desired sealing action.

In various embodiments, the male member 12 and/or the female member 14 can be made of plastic material.

In various embodiments, the sealing action exemplified here as carried out by means of the O-rings 160 may be implemented by means of strips of elastomer material (for example silicone or polyurethane foam) deposited in the positions shown here as occupied by the O-rings 160.

In various embodiments, it is possible to use integrated sealing rings molded directly onto the surface of the enlarged head part or flange 12b and/or of the "nut" forming the female member 14.

In various embodiments, using, for the outer toothed profile of the head part or flange 12b, a profile different from a hexagonal profile, it is possible to ensure that only those who dispose of a specific tool can intervene on the device 10 (for example with a view to removing same), thus resulting in increased safety conditions.

In various embodiments, the resistance to the eventuality of an undesirable removal action may be reinforced by associating layers of glue or of other adhesive materials with the device 10.

Various embodiments however allow one or more of the following advantages to be obtained:
- reduction of the assembly operations, virtually reconcilable to a single operation,
- simplification of the activity associated with the process of production (for example of LED modules): for example, it is possible to avoid carrying out screwing operations with a tool inside the housing,
- reduction of the solicitations, in particular on the cable, in as much as it is possible to carry out an action for retaining the cable against its extraction without having to dispose of a retaining element, for example a clamp, inside the housing,
- reduction of the part of the device situated outside of the housing, which allows, for example, the cable C to be bent by 90° immediately at the exit of the housing,
- removal of the device that restrains the cable in the hole is only permitted to those disposing of a suitable tool, which improves the characteristics of safety and of reliability of the equipment with which the device is associated.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for passing an electrical cable through a hole in a housing of a lighting source device, the method comprising:
   inserting a cable into the hole; wherein the cable has a tubular mushroom-shaped male member fitted thereon; wherein the male member comprises a stem with a threaded portion and a portion with an enlarged head; and wherein the male member is configured to extend through said hole with said portion with enlarged head abutting against the periphery of the hole externally to the housing and said threaded portion protruding inside the housing; and
   retaining said male member in the hole by coupling with said threaded portion that protrudes inside the housing an annular female member in the form of a nut co-operating with the periphery of the hole inside said housing to counter the movement of the female member with respect to the housing; wherein at least one O-ring is disposed around the perimeter of the hole; wherein the housing comprises L-shaped engagement formations to slidably engage the annular female member; and wherein the L-shaped elements protrude from the housing in a parallel direction of travel of the tubular male member into the female member.

2. The method as claimed in claim 1, further comprising: coupling said female member with said threaded portion of said male member by screwing.

3. The method as claimed in claim 1, further comprising: providing retainer formations co-operating with the female member at the periphery of said hole inside said housing to prevent rotation thereof.

4. The method as claimed in claim 1, further comprising: the formation of said female member with a square shape.

5. The method as claimed in claim 1, further comprising: providing the periphery of said portion with enlarged head with a toothed profile in order to allow said male member to be driven in rotation.

6. The method as claimed in claim 1, further comprising: providing an annular sealing member in at least one position chosen from:
   the side of said portion with enlarged head of the male member facing toward the periphery of said hole outside of said housing;
   the side of said female member facing toward the periphery of said hole inside said housing.

7. The method as claimed in claim 1, wherein the male member and the female member are made of a plastic material.

8. The method as claimed in claim 1, wherein the L-shaped elements substantially extend along one or more sides of the female member in a direction perpendicular to the direction of travel of the male member into the female member.

9. A lighting source device comprising:
   a tubular male member configured to be fitted onto a cable, the male member being mushroom-shaped and comprising a stem with a threaded portion and a portion with an enlarged head; wherein the male member comprises the cable; and wherein the male member is configured to be inserted into a hole;
   an annular female member in the form of a nut able to be coupled with said threaded portion of the male member in order to retain the male member in the hole, the female member being configured for co-operating with the periphery of the hole inside said housing to counter the movement of the female member with respect to the housing;
   at least one O-ring is disposed around the perimeter of the hole;
   a housing comprising L-shaped engagement formations configured to slidably engage the annular female member; and wherein the L-shaped elements protrude from the housing in a parallel direction of travel of the tubular male member into the female member.

\* \* \* \* \*